(12) United States Patent
Ellgas et al.

(10) Patent No.: US 11,072,244 B2
(45) Date of Patent: Jul. 27, 2021

(54) METHOD FOR CONTROLLING THE ELECTRICAL CHARGING OF A GROUP OF VEHICLES

(71) Applicant: Bayerische Motoren Werke Aktiengesellschaft, Munich (DE)

(72) Inventors: Simon Ellgas, Mountain View, CA (US); Enrique Marcial-Simon, Veitshoechheim (DE); Thomas Stauner, Unterschleissheim (DE); Rainer Mehlhorn, Landsham (DE); Xaver Pfab, Herdweg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/109,882

(22) Filed: Aug. 23, 2018

(65) Prior Publication Data

US 2018/0361868 A1 Dec. 20, 2018

Related U.S. Application Data

(63) Continuation of application No. PCT/EP2016/079919, filed on Dec. 6, 2016.

(30) Foreign Application Priority Data

Feb. 24, 2016 (DE) ..................... 10 2016 202 808.1

(51) Int. Cl.
*B60L 53/63* (2019.01)
*B60L 53/68* (2019.01)
(Continued)

(52) U.S. Cl.
CPC ........... *B60L 11/1844* (2013.01); *B60L 53/53* (2019.02); *B60L 53/63* (2019.02); *B60L 53/665* (2019.02);
(Continued)

(58) Field of Classification Search
CPC ...... B60L 11/1844; B60L 53/53; B60L 53/68; B60L 53/63; B60L 53/665;
(Continued)

(56) References Cited

U.S. PATENT DOCUMENTS

| 7,184,903 B1 | 2/2007 | Williams et al. |
| 2008/0039980 A1 | 2/2008 | Pollack et al. |

(Continued)

FOREIGN PATENT DOCUMENTS

| CN | 104078978 A | 10/2014 |
| CN | 104540706 A | 4/2015 |

(Continued)

OTHER PUBLICATIONS

Wikipedia entry for "demand response", published Nov. 4, 2015 and retrieved from internet archive wayback machine. Retrieved from the internet on Mar. 24, 2020 URL<https://web.archive.org/web/20151104060401/https://en.wikipedia.org/wiki/Demand_response> (Year: 2015).*

(Continued)

*Primary Examiner* — Kenneth M Lo
*Assistant Examiner* — Jonathan Michael Skrzycki
(74) *Attorney, Agent, or Firm* — Crowell & Moring LLP

(57) ABSTRACT

A method controls the electrical charging of a group of vehicles which are electrically connected to a power supply system of a power supply system operator, wherein the respective vehicles obtain power for charging a vehicle energy store from the power supply system. A central control system can communicate with the respective vehicles and with a server of the power supply system operator and a number of electrical units via communication signals, wherein the number of electrical units each have a higher response time for an electrical power adjustment in response to communication signals from the central control system (Continued)

and/or a higher time synchronicity with respect to a clock of the central control system in comparison with the vehicles. In response to a received reduction command from the server, the control system transmits one or more first commands which suspend the charging of vehicle energy stores to vehicles in the group, wherein the reduction command stipulates a power amount by which the power consumption of the group of vehicles in the power supply system should be reduced. The control system also determines, at pre-defined intervals of time, a power value which is composed of the reduction in the total power consumption of the vehicle energy stores and the number of electrical units plus the increase in the total power output of the vehicle energy stores and the number of electrical units. In this case, the control system regulates the power value to the power amount according to the reduction command using one or more second commands which are transmitted to electrical units by the control system and change the power consumption and/or power output of electrical units.

14 Claims, 2 Drawing Sheets

(51) Int. Cl.
| | | |
|---|---|---|
| *B60L 53/53* | (2019.01) | |
| *H02J 3/14* | (2006.01) | |
| *B60L 11/18* | (2006.01) | |
| *H02J 7/00* | (2006.01) | |
| *B60L 53/66* | (2019.01) | |
| *G05B 19/042* | (2006.01) | |

(52) U.S. Cl.
CPC ............ *B60L 53/68* (2019.02); *G05B 19/042* (2013.01); *H02J 3/14* (2013.01); *H02J 7/0013* (2013.01); *B60L 2250/14* (2013.01); *G05B 2219/2639* (2013.01); *Y02E 60/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/12* (2013.01)

(58) Field of Classification Search
CPC ....... B60L 2250/14; H02J 7/0013; H02J 3/14; G05B 19/042; G05B 2219/2639; Y02T 10/7055; Y02T 90/14; Y02T 10/7005; Y02T 90/121; Y02T 90/128; Y02T 90/163; Y02T 90/168; Y02T 10/7088; Y02T 90/16; Y04S 10/126; Y04S 30/12; Y02E 60/721
See application file for complete search history.

(56) References Cited

U.S. PATENT DOCUMENTS

| | | | | |
|---|---|---|---|---|
| 2008/0040479 A1* | 2/2008 | Bridge | ...................... | B60L 3/12 |
| | | | | 709/224 |
| 2010/0134067 A1 | 6/2010 | Baxter et al. | | |
| 2010/0301809 A1 | 12/2010 | Bhade et al. | | |
| 2011/0202221 A1 | 8/2011 | Sobue et al. | | |
| 2012/0235646 A1 | 9/2012 | Lo et al. | | |
| 2013/0002188 A1 | 1/2013 | Uyeki | | |
| 2013/0057211 A1 | 3/2013 | Kuribayashi et al. | | |
| 2013/0124002 A1* | 5/2013 | Greene | ................... | G05B 15/02 |
| | | | | 700/296 |
| 2013/0211988 A1 | 8/2013 | Dorn et al. | | |
| 2014/0084874 A1 | 3/2014 | Eger et al. | | |
| 2014/0203077 A1 | 7/2014 | Gadh et al. | | |
| 2014/0361745 A1 | 12/2014 | Nishita et al. | | |
| 2015/0298567 A1* | 10/2015 | Uyeki | .................. | B60L 11/1848 |
| | | | | 320/155 |
| 2015/0346697 A1 | 12/2015 | Mailloux et al. | | |
| 2016/0009192 A1 | 1/2016 | Zhang et al. | | |
| 2016/0052413 A1* | 2/2016 | Shimizu | ................. | G06Q 10/06 |
| | | | | 700/291 |
| 2016/0332527 A1 | 11/2016 | North et al. | | |
| 2017/0166219 A1 | 6/2017 | Jammoussi et al. | | |

FOREIGN PATENT DOCUMENTS

| | | |
|---|---|---|
| DE | 10 2011 003 993 A1 | 8/2011 |
| DE | 10 2011 109 422 A1 | 2/2013 |
| DE | 10 2012 103 208 A1 | 10/2013 |
| DE | 10 2013 000 981 A1 | 7/2014 |
| DE | 11 2012 005 488 T5 | 10/2014 |
| WO | WO 2012/149965 A1 | 11/2012 |
| WO | WO 2012/163396 A1 | 12/2012 |
| WO | WO 2014/083425 A2 | 6/2014 |

OTHER PUBLICATIONS

United States Notice of Allowance issued in U.S. Appl. No. 16/109,863 dated Nov. 13, 2019 (19 pages).
Malhotra et al., "Use Cases for Stationary Battery Technologies: A Review of the Literature and Existing Projects", Renewable and Sustainable Energy Reviews, 2016, pp. 705-721, vol. 56, XP029387113 (17 pages).
Jossen et al. Moderne Akkumulatoren richtig einsetzen 1. Ausgabe, Reichardt Verlag Untermeitingen, 2006, pp. 148-149 (three (3) pages).
English translation of document C3 (German-language Office Action previously filed on Aug. 23, 2018) (seven (7) pages).
International Search Report (PCT/ISA/210) issued in PCT Application No. PCT/EP2016/079920 dated Feb. 22, 2017 with English translation (seven pages).
German-language Written Opinion (PCT/ISA/237) issued in PCT Application No. PCT/EP2016/079920 dated Feb. 22, 2017 (nine pages).
German-language Office Action issued in counterpart German Application No. 10 2016 202 813.8 dated Nov. 11, 2016 (eight pages).
International Search Report (PCT/ISA/210) issued in PCT Application No. PCT/EP2016/079919 dated Feb. 24, 2017 with English translation (seven pages).
German-language Written Opinion (PCT/ISA/237) issued in PCT Application No. PCT/EP2016/079919 dated Feb. 24, 2017 (nine pages).
International Search Report (PCT/ISA/210) issued in PCT Application No. PCT/EP2016/079916 dated Feb. 17, 2017 with English translation (seven pages).
German-language Written Opinion (PCT/ISA/237) issued in PCT Application No. PCT/EP2016/079916 dated Feb. 17, 2017 (seven pages).
English-language Chinese Office Action issued in counterpart Chinese Application No. 201680078394.X dated Nov. 24, 2020 (seven (7) pages).

* cited by examiner

METHOD FOR CONTROLLING THE ELECTRICAL CHARGING OF A GROUP OF VEHICLES

CROSS REFERENCE TO RELATED APPLICATIONS

This application is a continuation of PCT International Application No. PCT/EP2016/079919, filed Dec. 6, 2016, which claims priority under 35 U.S.C. § 119 from German Patent Application No. 10 2016 202 808.1, filed Feb. 24, 2016, the entire disclosures of which are herein expressly incorporated by reference.

This application contains subject matter related to U. S. application Ser. Nos. 16/109,863, entitled "Method for Controlling Electrical Charging of a Group of Vehicles" and 16/109,120, entitled "Method and Central Control System for Controlling the Electrical Charging of a Group of Vehicles" both filed on Aug. 23, 2018.

BACKGROUND AND SUMMARY OF THE INVENTION

The invention relates to a method for controlling the electrical charging of a group of vehicles, and to a corresponding control system.

From the prior art it is known to control the charging of the energy stores of a group or pool of electrically drivable vehicles using a control system, in such a way that the requirements of the operator of the power network to be used are taken into account in regard to a reduction in performance. In other words, given a corresponding requirement of the electricity network operator, the charging of certain vehicles of the vehicle pool can be interrupted or delayed, in order to reduce the power consumption in the power network. In this case, the charging is suspended only for those vehicles for which the interruption of the charging process will have no effect on a departure time specified by the vehicle user, i.e. even with a later resumption of the charging operation there will still be enough time to charge the vehicle fully or up to a specified charging state.

In the above method, in which the charging of a vehicle pool is controlled in order to compensate for overloads in the power network, it may be the case that a power reduction requested by the power network operator cannot be achieved by interrupting the charging operations of the vehicle-side energy stores. There are therefore approaches that, in such cases, in addition power from one or more electrical units, and in particular from a static battery store, is fed into the power network in order to fulfill the requirements of the power network operator.

When a power reduction is performed using vehicle-side energy stores, the problem arises that the vehicles often have a high response time to commands of a central control system and/or they do not operate time-synchronously with the control system. As a result, a rapid reduction of the power based on the requirements of the power network operator is not always feasible.

The object of the invention therefore is to control the process of charging a group of vehicles, in such a way that requirements of the power network operator for power reduction can be rapidly fulfilled.

This and other objects are achieved by a method according to the invention used to control the electrical charging of a group of vehicles, which are electrically connected to a power network of a power network operator, wherein the respective vehicles draw electricity from the power network to charge a vehicle-side energy store for powering the respective vehicle. In other words, the vehicles are electrically powered vehicles, such as pure electric vehicles or hybrid vehicles. In the method according to the invention, a central control system can communicate with the respective vehicles of the group and with a server of the power network operator and with a number of electrical units (i.e. at least one electrical unit) using communication signals. The number of electrical units comprises one or more power consumption and/or power supply units, which each have a faster response time for an electrical power adjustment in response to communication signals from the central control system, and/or a greater time synchronization in relation to a clock of the central control system in comparison to the vehicles. In other words, a corresponding electrical unit can respond faster to communication signals from the central control system with a power adjustment and/or a corresponding electrical unit has a local clock, which corresponds more exactly with the clock of the central control system than the local clocks of the vehicles. The response time can be specified in a known manner by a mean response or delay time. The time synchronization can be specified in a known manner by a deviation of the local clock from the clock of the central control system per unit of time. The higher this time deviation, the lower the time synchronization.

In the method according to the invention, in response to a received reduction command which originates from the server of the power network operator, the central control system sends one or more first commands to at least some of the vehicles. In the event that the central control system transmits a plurality of commands, these are essentially transmitted at the same time. The first commands effect a suspension of the charging of the vehicle-side energy store of at least some vehicles. A reduction command defines an amount of power, by which the power consumption of the group of vehicles the power network is to be reduced.

In the context of the method according to the invention, the central control system determines a power value at specified intervals from the time of issue of the first command or commands. In other words, the central control system determines a power value at specified intervals from the time of issue of the first command or commands. This power value is composed of the (currently existing) reduction in the total power consumption of the vehicle-side energy stores of the vehicles of the group and of the number of electrical units in comparison to the total power consumption at the time of issuing the first command or commands, plus the (currently existing) increase in the total power output of the vehicle-side energy stores of the vehicles of the group and of the number of electrical units in comparison to the total power output at the time of issuing the first command or commands. The reduction of the total power consumption has a positive value, provided a reduction actually exists. However, if it should transpire during the monitoring that there was in fact an increase in the power consumption, then the value of the reduction is negative. Similarly, the increase in the total power output has a positive value, provided that the total power output actually becomes larger. If the total power output decreases, however, this value is negative. A corresponding power consumption value for a vehicle-side energy store or an electrical unit has the value 0 if either no power is being consumed, or a power output is taking place instead of a power consumption. Similarly, the value of a power output of a vehicle-side energy store or an electrical unit is 0, if either no power output is taking place or a power consumption is taking place instead.

In particular, the above power value can be expressed as the sum of a power consumption difference and a power output difference. The power consumption difference is the difference between the total power consumption of the vehicle-side energy stores of the vehicles of the group and the number of electrical units at the time of issuing the first command or commands and the current total power consumption. This means that in the case of a decrease in the total power consumption after issuing the first commands the power consumption difference is positive, and in the case of an increase it is negative. In contrast the power output difference is the difference between the current total power output of the vehicle-side energy stores of the vehicles of the group and the number of electrical units and the current total power output at the time of issuing the first command or commands. In other words, the power output difference is positive in the case of an increase in the total power output and negative in the case of a decrease in the total power output.

In the context of the method according to the invention, the central control system regulates the power value to the amount of power in accordance with the reduction command. For this purpose, it uses one or more second commands, which it sends to at least a subset of the number of electrical units, and which effect a change in the power consumption and/or power output of the at least one subset of the number of electrical units.

The method of the invention is characterized by the fact that, by way of a regulation which relies on electrical units with a faster reaction time or greater synchronization, a fast and accurate power reduction by a group of vehicles can be effected in response to a request from a power network operator. Within this regulation, the power value represents the controlled variable, the amount of power the reference variable (setpoint value) and the change in the power consumption and/or power output of the at least one subset of the number of electrical units represents the manipulated variable.

In a particularly preferred embodiment of the method according to the invention, the number of electrical units comprises one or more static energy stores. Preferably, these static energy stores are one or more static battery storage units. For example, the static battery storage units can be assembled from discarded vehicle batteries. Alternatively or additionally, the number of electrical units can comprise one or more electrical energy generating systems, in particular one or more electric generators. Static energy stores and/or electrical energy generating systems usually have a good and fast facility for controlling their electrical power.

In another preferred embodiment of the method according to the invention, the central control system determines the power value by querying power measurements from one or more measuring devices at the charging points of the vehicles and from one or more measuring devices on the number of electrical units. The corresponding power measurements can be stored in a central data store or in a cloud, to which the central control system has access.

In a further alternative design of the invention, a plurality of types of electrical units are present, wherein the response times of the electrical units of each type are in a different value range than the response times of the electrical units of another type and/or wherein the synchronizations of the electrical units of each type are in a different value range than the synchronizations of the electrical units of another type. The value ranges are preferably disjoint. The term value range is also to be interpreted broadly and may also include only a single value. In the context of this embodiment, in regulating the power value to the amount of power in accordance with the reduction command, the central control system taken account of the types of electrical units in descending order of the value ranges of the reaction times and/or in ascending order of the value ranges of the synchronizations. In this way, in the regulation the electrical units are taken into account incrementally in the order in which their response time or time synchronization improves.

In a further configuration of the method according to the invention, in each case a charging time window, a departure time and a target charging state of the vehicle-side energy store at the departure time are defined in advance for one or more specific vehicles of the group, wherein the charging process of the vehicle-side energy store of the specific vehicle takes place in accordance with the charging time window such that a charging time criterion is fulfilled, so that (i.e. on fulfillment of the charging criterion) the charging process takes place entirely within the charging time window or contains the entire charging time window, while at the same time it is ensured that the target charging state is reached not later than the departure time. In this embodiment, in the event that the central control system sends a first command to a specific vehicle, the charging process in accordance with the charging time window is suspended for a predetermined time interval and a new charging time window is defined, which differs from the charging time window currently being used, wherein the beginning of the new charging time window occurs after the specified time interval and the charging process in accordance with the new charging time window otherwise fulfils the charging time criterion with an unchanged departure time and target charging state. With this alternative design of the invention therefore, corresponding departure times and target charging states are taken into account in a suspension of the charging process. Preferably, the departure time and/or the target charge state can be specified by a user of the corresponding vehicle, e.g. when the vehicle is connected to a charging station.

The method also relates to a central control system for controlling the electrical charging of a group of vehicles, which are electrically connected to a power network of a power network operator, wherein the respective vehicles draw electricity from the power network to charge a vehicle-side energy store for powering the respective vehicle. The central control system can communicate with the respective vehicles of the group and with a server of the power network operator and with a number of electrical units using communication signals. The number of electrical units comprises one or more power consumption and/or power supply units, which each have a faster response time for an electrical power adjustment in response to communication signals from the central control system, and/or a greater time synchronization in relation to a clock of the central control system in comparison to the vehicles.

The central control system according to the invention is designed in such a way that in response to a received reduction command which originates from the server of the power network operator, it issues to at least a subset of the vehicles of the group one or more first commands, which cause a suspension of the charging of the vehicle-side energy stores of the at least one subset of the vehicles. A reduction command defines an amount of power, by which the power consumption of the group of vehicles on the power network is to be reduced.

The central control system is additionally configured in such a way that at specified intervals from the time of issue of the first command or commands, it determines a power value which is composed of the reduction in the total power consumption of the vehicle-side energy stores of the vehicles of the group and of the number of electrical units in comparison to the total power consumption at the time of issuing the first command or commands, plus the increase in the total power output of the vehicle-side energy stores of the vehicles of the group and the number of electrical units in comparison to the total power output at the time of issuing the first command or commands.

The central control system is additionally configured to regulate the power value to the amount of power in accordance with the reduction command using one or more second commands. The second commands are sent from the central control system to at least a subset of the number of electrical units, and these commands effect a change in the power consumption and/or the power output of the at least one subset of the number of electrical units.

The control system just described is preferably designed in such a way that it can perform one or more preferred variants of the method according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
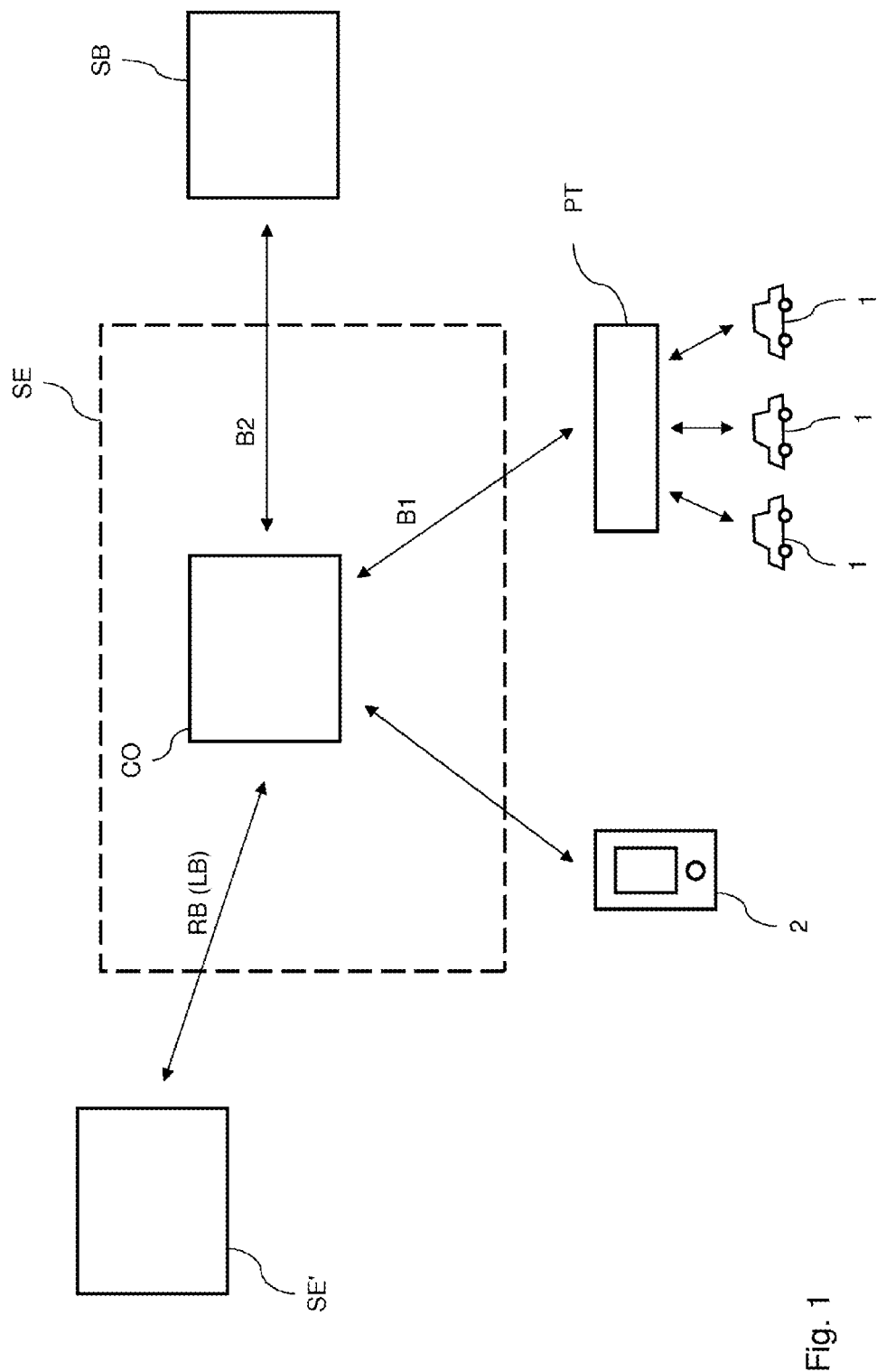
FIG. 1 is a schematic illustration of an infrastructure in which an embodiment of the method according to the invention is implemented.

FIG. 1 shows a schematic representation of an infrastructure for implementing the method according to the invention. A core component of this infrastructure is a central control unit CO, which is integrated in a server SE and is used to control the charging of a fleet of a plurality of electrically powered vehicles (i.e. the drive batteries of these vehicles). As an example, three electric vehicles 1 from this vehicle fleet are shown. These vehicles are connected by communication techniques to the control unit CO via a portal PT. The control system CO has access via a suitable control back-end (not shown) to the portal PT, which in turn can communicate with the individual vehicles 1, for example via SMS. By means of the communication path via the portal PT, a charging time window can be transmitted from the control system CO to the individual vehicles 1. This charging time window is used to define the time sequence of the charging process for the corresponding vehicle. In addition, by means of the communication path via the portal, first commands B1 are transmitted to specific vehicles to suspend the charging process of the drive batteries of these vehicles, as described in more detail below.

Each vehicle 1 in the vehicle fleet is associated with a user who has a smartphone 2, wherein for reasons of clarity only a single smartphone is indicated. With this smartphone, the user can communicate with the control system CO via the control back-end, not shown here, and on the other hand, with his/her vehicle via the portal PT. In particular, when charging the drive battery of the vehicle via a power network, the user can specify a charging time window in which the charging is particularly inexpensive. The battery is then preferably charged in the charging time window. The user can also define a departure time and the target charging state at the departure time (usually 100%). This information is sent via the smartphone 2 both to the central control system CO and to the vehicle 1 of the user.

The control system CO according to FIG. 1 also communicates with a server SE', which belongs to a power network operator, on whose power network the vehicles 1 of the vehicle fleet or their batteries are charged. In the event of an overload in the power network, a reduction command RB is sent from this server SE' to the control system CO. This command specifies an amount of power LB, by which the power extracted through the vehicle pool by electrical charging should be reduced.

In addition, in the infrastructure of FIG. 1 an energy storage system is provided in the form of a static battery storage unit SB, which can be controlled using the control system CO by means of a suitable interface and which belongs to the operator of the control system CO. The battery storage unit can feed current into or extract current from the power network of the electricity network operator based on the control via the control system CO. As part of the control of the battery storage unit, second commands B2 are sent from the control system to the battery storage unit, as is explained in greater detail below. The operator of the control system, for example, is the manufacturer of the vehicles 1 of the vehicle fleet.

An objective of the infrastructure of FIG. 1 is that the power network operator can send the reduction commands RB via its server SE' to the control system CO in the event of overload in its power network. Then, by issuing of first commands B1 to at least a subset of the currently charging vehicles 1 the control system suspends the charging of these vehicles for a predefined suspension interval in order to reduce the load in the power network. The suspension period in the embodiment described here is specified permanently and has a value of one hour. The charging process is only suspended for those vehicles in which it is certain that after the resumption of the charging process after the period of suspension, enough time is still available until the departure time to allow the drive battery of the corresponding vehicle to be charged to the target charging state.

Since the response times of the vehicles to the first commands B1 are very different and may sometimes also be very long, in the context of the embodiment described here the power of the battery storage unit which is consumed or output is also adjusted using the second commands B2, to thereby achieve a rapid and accurate adjustment of the power reduction to the amount of power LB of the reduction command RB, as is described in the following on the basis of FIG. 2. This takes advantage of the fact that the battery storage unit SB can adjust its power faster and more accurately than the vehicles 1.

Figure 2:
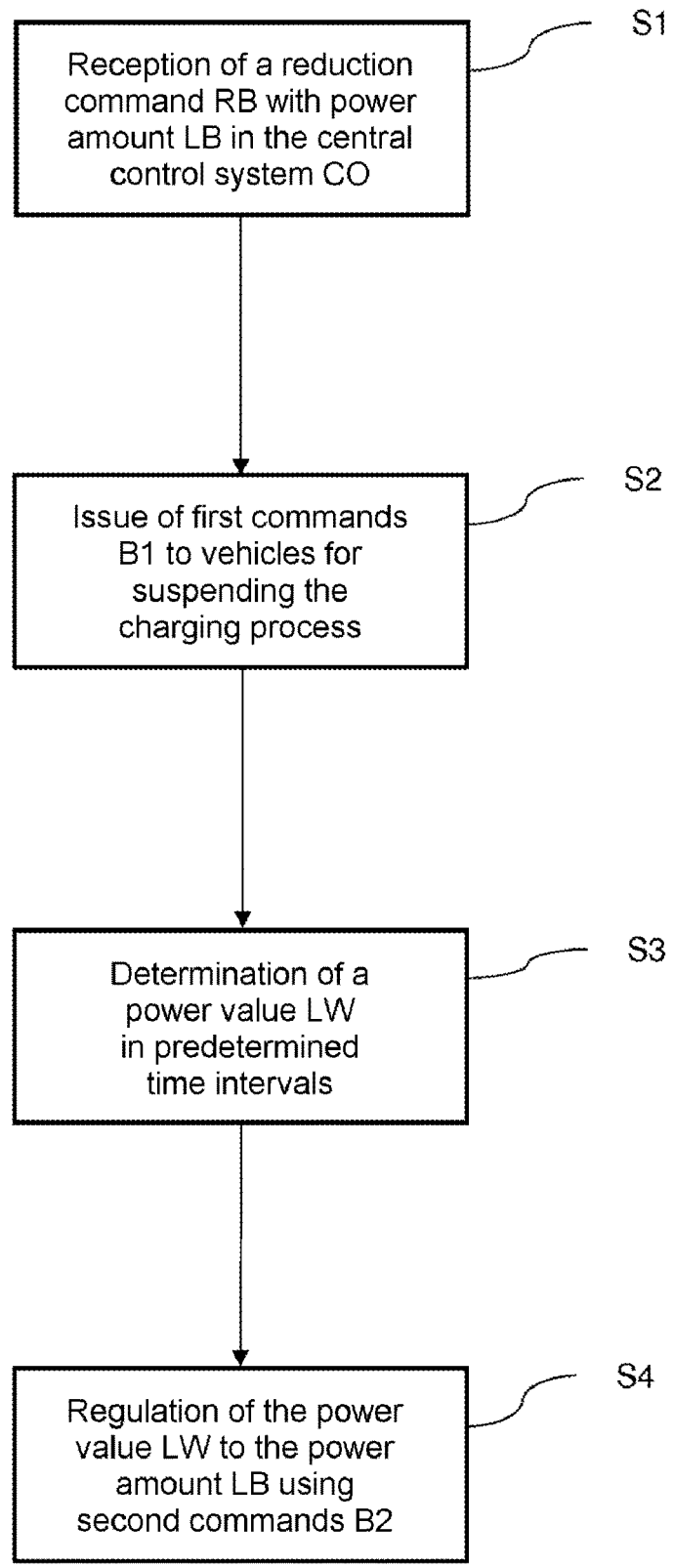
FIG. 2 is a flow diagram, which illustrates the sequence of an embodiment of the method according to the invention.

In accordance with step S1 of FIG. 2, in the event of an overload of the power network a reduction command RB with the appropriate amount of power LB is issued by the server SE' and received in the central control system CO. Then, the control system identifies those vehicles of the vehicle fleet for which a suspension of the charging process by the specified suspension interval is possible without changing the corresponding departure time or target charge condition for the vehicle. Then, according to step S2 first commands B1 are sent either to all or possibly only a subset of the identified vehicles. If possible, the first commands are sent to a sufficient number of vehicles such that by suspending the charging process in these vehicles, a reduction of the power consumption by the vehicle-side drive batteries by the power amount LB is obtained. The first commands, upon receipt in the vehicles 1, cause a suspension of the charging process for the predetermined suspension time interval in the corresponding drive batteries.

In order to obtain a rapid reduction of the power by the amount of power LB, in step S3 a power value LW is determined at predetermined time intervals by the control system CO. As previously mentioned above, this power value is composed of the (currently existing) reduction in the total power consumption of the drive batteries of the vehicles of the vehicle pool and of the battery storage unit in comparison to the total power consumption at the time of issuing the first commands B1, plus the (currently existing) increase in the total power output of the drive batteries of the vehicles of the vehicle pool and of the battery storage unit in comparison to the total power output at the time of issuing the first command or commands. The determination of the power value LW is based on measured values of corresponding measurement devices in the drive batteries of the vehicles 1 and the battery storage unit SB, which are retrieved by the control system CO, e.g. from a cloud storage system. The measured values are transferred from the measuring devices to this cloud storage system.

As part of a regulation process in accordance with step S4 of FIG. 2, the power value LW is set to the power value LB, for which second commands B2 are used, which are sent by the control system CO to the battery storage unit for adjusting the power consumption or power output of the latter. In other words, in this regulation process the power consumption or power output of the battery storage unit SB represents the manipulated variable, whereas the power value LW, measured on a regular basis, is the control variable and the amount of power LB is the reference variable. Since the rapidly responsive battery storage unit SB is taken into account in this regulation process, a rapid and accurate adjustment of the reduction of power to the target power amount is obtained.

The alternative design of the method according to the invention just described only has recourse to a single battery storage unit SB during the regulation. Alternatively however, a plurality of such battery storage units and, if appropriate, other electrical units can be used for energy production or energy consumption, provided these have a faster response time for a power adjustment compared to the vehicles.

The embodiments of the invention described in the foregoing have a number of advantages. In particular, the control of the charging of a pool of vehicles using a common control system is enabled in such a way as to allow a rapid and accurate response to the requirements of a power network operator with regard to a power reduction. In addition to vehicle-side energy stores, one or more other electrical units with fast response times are also used.

LIST OF REFERENCE NUMERALS 1 electric vehicle
2 smartphone
CO central control unit
SE, SE' servers
SB static battery store
PT portal
RB reduction command
LB power amount
LW power value
B1 first commands
B2 second commands The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling electrical charging of a group of vehicles, which are electrically connected to a power network of a power network operator and configured to output to and/or consume power from the power network, wherein a central control system can communicate with respective vehicles of the group and with a server of the power network operator and with a number of electrical units using communication signals, wherein the number of electrical units comprises one or more non-vehicle power consumption and/or non-vehicle power output units only, which each have a faster response time for an electrical power adjustment in response to communication signals from the central control system and/or a greater time synchronization in relation to a clock of the central control system in comparison to the vehicles, wherein the method comprises the steps of:
  receiving a reduction command from the server of the power network operator that specifies an amount of power by which the power consumption of the group of vehicles on the power network is to be reduced;
  in response to the received reduction command, issuing one or more first commands from the central control system to a subset of the vehicles of the group only, which effect a suspension of the charging of vehicle-side energy stores of the subset of vehicles;
  issuing one or more second commands from the central control system to a subset of the number of electrical units only, which effect a change in the power consumption and/or power output of the subset of the number of electrical units
  at specified time intervals from the time of issue of the one or more first commands, determining a power value by the central control system, the power value comprising:
    a reduction in the total power consumption of:
      the vehicle-side energy stores of the vehicles and of the number of electrical units in comparison to the total power consumption at the time of issuing the one or more first commands,
    plus, an increase in the total power output of:
      the vehicle-side energy stores of the vehicles and of the number of electrical units in comparison to the total power consumption at the time of issuing the one or more first commands, wherein
        the central control system, via the one or more second commands regulates the power value to the amount of power in accordance with the reduction command.

2. The method as claimed in claim 1, wherein the number of electrical units comprises one or more static energy stores.

3. The method as claimed in claim 2, wherein the static energy stores are battery storage units.

4. The method as claimed in claim 1, wherein the number of electrical units comprises one or more electrical energy generating systems.

5. The method as claimed in claim 4, wherein the electrical energy generating systems are electric generators.

6. The method as claimed in claim 1, wherein
the central control system acquires the power value by querying power measurements from one or more measuring devices at the charging points of the vehicles and from one or more measuring devices on the number of electrical units.

7. The method as claimed in claim 1, wherein
a plurality of types of electrical units are present,
response times of the electrical units of each type are in a different value range than response times of the electrical units of another type, or the time synchronizations of the electrical units of each type are in a different value range than the time synchronizations of the electrical units of another type,
the central control system regulates the power value to the amount of power both in accordance with the reduction command and a descending order of the value ranges of the response times of the electrical units or in ascending order of the value ranges of the time synchronizations of the electrical units.

8. The method as claimed in claim 1, further comprising the steps of:
in each case a charging time window, a departure time and a target charging state of the vehicle-side energy store at the departure time are defined in advance for one or more specific vehicles of the group, wherein a charging process of the vehicle-side energy store of the specific vehicle takes place in accordance with the charging time window such that a charging time criterion is fulfilled, so that the charging process takes place entirely within the charging time window or contains the entire charging time window while at the same time it is ensured that the target charging state is reached not later than the departure time; and
in the event that the central control system sends a first command to a specific vehicle, the charging process in accordance with the charging time window is suspended for a predetermined time interval and a new charging time window is determined, which differs from the charging time window currently being used, wherein
a beginning of the new charging time window occurs after the specified time interval and the charging process in accordance with the new charging time window otherwise fulfils the charging time criterion with an unchanged departure time and target charging state.

9. A central control system for controlling electrical charging of a group of vehicles, which are electrically connected to a power network of a power network operator and configured to output to and/or consume power from the power network, wherein the central control system communicates with the respective vehicles of the group and with a server of the power network operator and with a number of electrical units using communication signals, wherein the number of electrical units comprises one or more non-vehicle power consumption and/or non-vehicle power output units only, which each have a faster response time for an electrical power adjustment in response to communication signals from the central control system and/or a greater time synchronization in relation to a clock of the central control system in comparison to the vehicles, comprising:
a central control unit operatively configured to:
receive a reduction command from the server of the power network operator that specifies an amount of power by which the power consumption of the group of vehicles on the power network is to be reduced;
in response to the received reduction command, issue one or more first commands, to a subset of the vehicles of the group only, which effect a suspension of the charging of vehicle-side energy stores of the subset of the vehicles;
issue one or more second commands to a subset of the number of electrical units only, which effect a change in the power consumption and/or power output of the subset of the number of electrical units;
at specified time intervals from the time of issue of the one or more first commands, determine a power value, comprising:
a reduction in the total power consumption of:
the vehicle-side energy stores of the vehicles of the group and of the number of electrical units in comparison to the total power consumption at the time of issuing the one or more first commands,
plus, an increase in the total power output of:
the vehicle-side energy stores of the vehicles of the group and the number of electrical units in comparison to the total power output at the time of issuing the one or more first commands, and
regulate, via the one or more second commands, the power value to the amount of power in accordance with the reduction command.

10. The control system as claimed in claim 9, wherein the number of electrical units comprises one or more static energy stores.

11. The control system as claimed in claim 9, wherein the number of electrical units comprises one or more electrical energy generating systems.

12. The control system as claimed in claim 9, wherein the central control unit acquires the power value by querying power measurements from one or more measuring devices at the charging points of the vehicles and from one or more measuring devices on the number of electrical units.

13. The control system as claimed in claim 9, wherein
a plurality of types of electrical units are present,
response times of the electrical units of each type are in a different value range than response times of the electrical units of another type, or the time synchronizations of the electrical units of each type are in a different value range than the time synchronizations of the electrical units of another type,
the regulation of the power value to the amount of power both in accordance with the reduction command and a descending order of the value ranges of the response times of the electrical units or in ascending order of the value ranges of the the time synchronizations of the electrical units.

14. The control system as claimed in claim 9, wherein the central control unit is further operatively configured to:
in each case a charging time window, a departure time and a target charging state of the vehicle-side energy store at the departure time are defined in advance for one or more specific vehicles of the group, wherein a charging process of the vehicle-side energy store of the specific vehicle takes place in accordance with the charging time window such that a charging time criterion is fulfilled, so that the charging process takes place entirely within the charging time window or contains the entire charging time window while at the same time it is ensured that the target charging state is reached not later than the departure time; and in the event that the central control system sends a first command to a specific vehicle, the charging process in accordance with the charging time window is suspended for a predetermined time interval and a new charging time window is determined, which differs from the charging time window currently being used, wherein a beginning of the new charging time window occurs after the specified time interval and the charging process in accordance with the new charging time window otherwise fulfils the charging time criterion with an unchanged departure time and target charging state.

* * * * *